Dec. 18, 1951     J. G. DOYLE     2,578,880
ROTATING CUTTING DISK TYPE MOWER
Filed Oct. 3, 1945
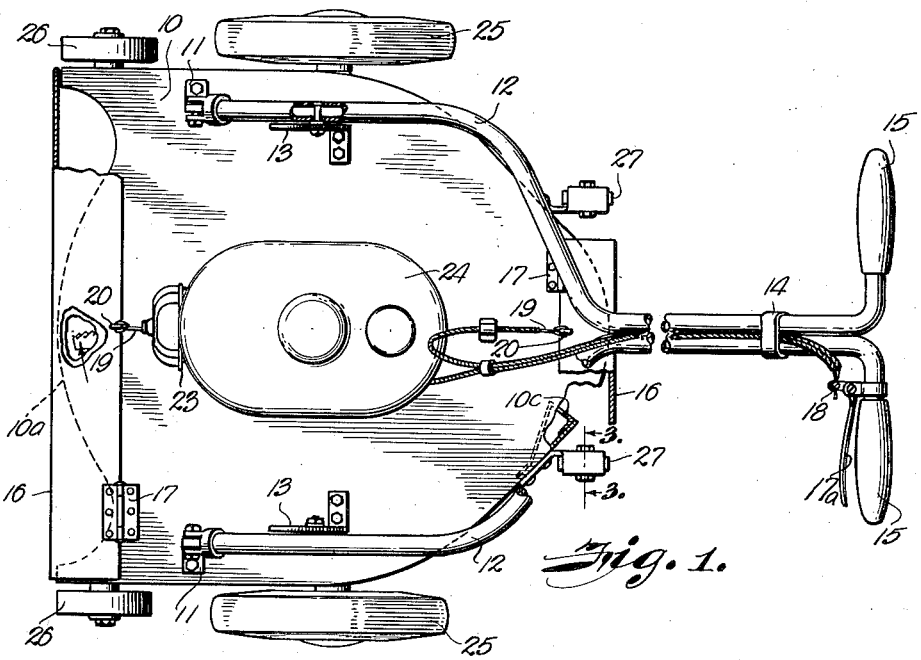
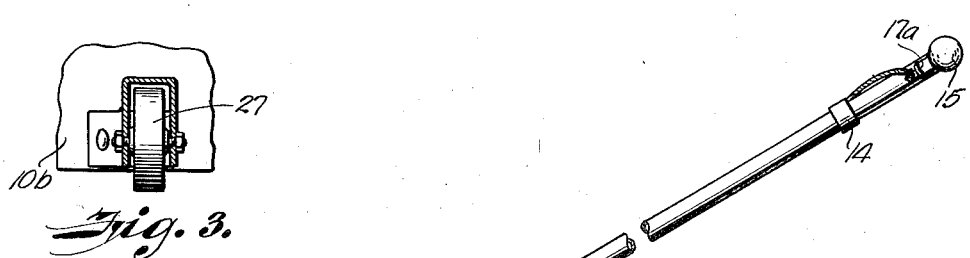
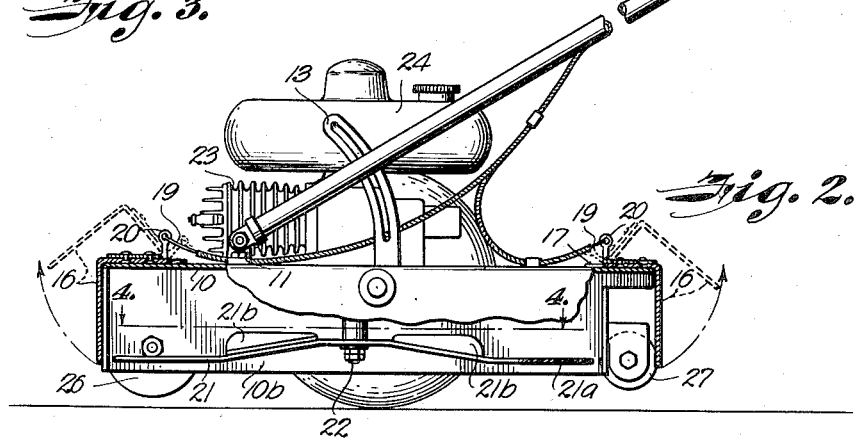
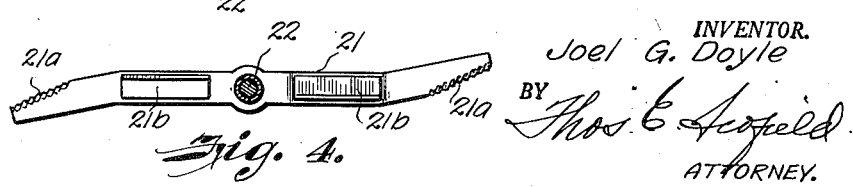
INVENTOR.
Joel G. Doyle
BY Thos. E. Scofield
ATTORNEY.

UNITED STATES PATENT OFFICE 2,578,880

ROTATING CUTTING DISK-TYPE MOWER

Joel G. Doyle, Kansas City, Mo., assignor to RPM Manufacturing Company, Kansas City, Mo., a corporation of Missouri Application October 3, 1945, Serial No. 620,046

5 Claims. (Cl. 56—25.4)

This invention relates to improvements in grass mowers and refers more particularly to mowers employing a horizontal blade rotating on a vertical axis and driven by a source of power mounted upon a platform beneath which the blade is rotated. This type of mower is conventional in so far as the arrangement of the blade-supporting platform and power source are concerned. The novelty in the instant mower construction resides in the positioning and arrangement of the ground wheels, in providing hinged guards at the front and back of the platform and in the construction of the platform to facilitate for discharge of the grass as it is cut.

In mowers utilizing a horizontal rotating blade it has been common practice to support the platform upon a single or double set of ground wheels, the main support wheels carrying the weight of the mower, the auxiliary wheels positioned either forward or rearward of the main wheels to serve as a supplemental support, to limit the inclination or rocking of the platform either forwardly or rearwardly according to the location of the auxiliary wheels with respect to the main support wheels.

The present construction provides two sets of auxiliary or leveling wheels located on opposite sides of the main support wheels so the inclination of the platform is limited in both its forward and rearward movement.

An object of the invention, therefore, is to provide a mower platform having ground wheels comprising centrally positioned main support wheels with auxiliary wheels located forwardly and rearwardly thereof.

Another object is to provide an arrangement of the ground wheels for the platform with auxiliary leveling wheels forwardly and rearwardly of the main support wheels, said leveling wheels having their traction surfaces somewhat above the traction surfaces of the main support wheels.

A further object is to provide a platform having lateral skirting interrupted at the front and rear and shaped to direct the grass when cut through the rear opening at an angle clear of the operator.

Other and further objects will appear from the following description.

In the drawings which form a part of the instant specification and are to be read in conjunction therewith and in which like reference numerals indicate like parts of the various views, Fig. 1 is a plan view of a mower embodying the invention with parts broken away, Fig. 2 is an elevational view with a portion of the skirting of the platform broken away to reveal the cutter blade and auxiliary wheel mountings, Fig. 3 is a view taken along the line 3—3 in Fig. 1 in the direction of the arrows, and Fig. 4 is a view taken along the line 4—4 in Fig. 2 in the direction of the arrows.

At 10 is shown a platform to which is pivoted by brackets 11 a handle 12. The handle shown comprises two tubes anchored at one end to the platform by pintles to the brackets 11 and braced upon the platform at slotted quadrants 13. The handle is movable upwardly or downwardly upon its lower pivots within the range permitted by the arcuate slots in quadrants 13. Limit stops not shown are preferably located in the slots of the quadrants at any desired position to locate and establish the lowered position for the handle and serve as an abutment for the handle when the mower is to be turned. Bolts through the tubular handle portions ride in the slots of the quadrants. The upper portions of the tubes or pipes which form the handle are held together by a clamping ring 14 and the outwardly bent extremities of these tubes are furnished with gripping member 15.

The front edge of the platform as shown in dotted lines at 10a, is shaped to conform with the circle circumscribed by the rotating blade. Along the lateral edges of the platform is a skirting 10b. This skirting is interrupted at the front of the platform providing an opening for admission of the grass to be cut. The skirting is also interrupted at the back of the platform where a somewhat narrower opening is provided due to the tapering of the platform and the extension of the skirting at both sides to a position indicated in the broken away portion in Fig. 1. Covering the front and rear openings formed by interruption of the skirting are angle shaped front and rear guards 16. These guards are attached to the platform 10 by hinges 17. The guards are operable from the gripping portions 15 of the handle by a member 17a. The squeezing of this member at the handle through a pivoted arm 18 draws flexible wire connections 19 through their jacketed tubing and by means of arms 20 pivot the guards 16 upon their hinges swinging the guards to the dotted line position shown in Fig. 2. Thus it will be seen that the guards 16 which cover the front and rear opening may be readily opened when the mower is in use and upon release of gripping member 17a the guards will close, dropping of their own weight over the openings which they cover and providing a desirable safety feature for the mower.

The cutting mechanism consists of a blade 21 mounted upon vertical shaft 22, which shaft is an extension of the crank shaft of a horizontally positioned internal combustion engine diagrammatically shown at 23. Located above the motor and supported upon the platform with the motor is fuel tank 24. Any suitable source of power may be used; the internal combustion engine is shown merely to indicate an operable mechanism for driving the cutter blade. The cutting portions at the ends of the blades are beveled and preferably serrated to provide more effective cutting edges. On top of the blade at opposite sides of the shaft are vanes 21b which serve to project the grass against the skirting and drive it out through the rear opening at an angle clear of the operator. A baffle 10c within the skirting at one side of the rear opening aids in directing and distributing the cut grass and prevents accumulation at the opening.

The ground wheels which support the platform comprise the main support wheels 25 located centrally of the platform on opposite sides thereof and two sets of auxiliary leveling wheels, one set 26 positioned forwardly of the main support wheels and a second set 27 positioned rearwardly of the main support wheels. As shown, the wheels 25 are carried upon an axle which extends transversely of the platform while the auxiliary front and rear wheels 26 and 27 are mounted upon short stub shafts carried by brackets mounted in the skirting of the platform. It is important to proper operation of the mower that the traction surfaces of both the front and rear auxiliary leveling wheels 26 and 27 be positioned somewhat above the traction surface of the main supporting wheels 25. This permits limited rocking of the platform forwardly and rearwardly during operation of the mower while preventing contact of the cutter with the ground, and facilitates turning of the mower on the main support wheels as a pivot while the front and rear auxiliary wheels are above and clear of the ground surface. It is also desirable to have the weight of the mower balanced slightly ahead of the main supporting wheel axle. The arrangement of the ground wheels with the central support for the platform and the front and rear auxiliary leveling wheels provides a construction which can be used on terraces and on irregular terrain without inconvenience and danger of the rotating blade striking the ground surface. Also when the mower encounters a depression into which the central supporting wheels dip the auxiliary leveling wheels will span the depression and support the platform upon the leveling wheels. This prevents damage to the rotating cutter by furnishing a support for the platform and rotating blade sufficiently high at all times above the ground to prevent the cutter from contacting the ground surface.

Thus it will be seen that the use of leveling wheels on opposite sides of the main supporting ground wheels permits a limited rocking of the platform upon the axle of the main supporting wheels and a rolling support for the platform at the front and rear sufficiently high to prevent the rotating cutter blade from being damaged by the irregular surface of the terrain over which the mower passes.

By tapering the platform and lateral skirting at the back a funnel shaped discharge opening is provided where the skirting is interrupted at the rear. Rotation of the cutter within the passageway formed by the skirting beneath the platform mows the grass at a height according to the setting of the blade. The effect of the vanes above the cutter is to throw the grass outwardly against the skirting and rearwardly through the opening. The resultant force of the rotating blade and the rearward tapering of the skirting causes the grass to be thrown from the rear opening at an angle to the direction of the travel of the mower and clear of the operator's legs and feet. The distribution of grass behind the mower is such that there is no perceptible windrowing, but the grass is scattered evenly over a rather wide area following the mower and to the side.

The guards are mounted to be easily manipulated from the handle by the operator. They may be opened when the mower is started and closed while it is standing or is not in use. These guards provide safety walls at front and rear and prevent access to the rotating blade when the mower is not in use.

It will be seen that the objects of the invention have been accomplished. There is provided a mower utilizing a horizontal blade which is rotated beneath a platform. The platform carries the power source for rotating the blade and is rolled upon three sets of ground wheels, the central set constituting the supporting wheels and the front and rear sets constituting auxiliary leveling wheels. The traction surfaces of the front and rear wheels are somewhat above the traction surfaces of the main wheels and the traction surfaces of the rear wheels are preferably slightly above those of the front wheels. This arrangement of the ground wheels permits use of the mower on a rough terrain without danger of damaging the current blade. The guards over the front and rear opening have a desirable safety feature and the narrowing of the platform toward the rear with corresponding shaping of the skirting to conform therewith provides a funnel opening at the rear of the platform and proper distribution of the grass as it is discharged from the cutter blade. As in most mowers of this type the blade is adjustable on the shaft to govern the length of the grass after cutting.

From the foregoing it will be seen that this invention is well adapted to attain the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. In a grass mower of the character described, in combination, a horizontal platform having a ground wheel at the center of each side whereby the platform is supported on the ground, the portion of the platform forwardly of said wheels being relatively square and wide and the portion of the platform rearwardly of said wheels tapering inwardly toward the rear of said platform, said platform having a depending skirt along each side thereof, the rear end portion of one of the skirts extending inwardly under the platform and forming with the rear end portion of the other skirt a funnel shaped discharge passage directed laterally at an angle to the direction of the travel of the mower, and a power source mounted on the platform and adapted to rotate a cutting blade disposed horizontally beneath the platform and connected to the power source for rotation thereby.

2. A grass mower as set forth in claim 1 and in which there are vanes on the top of the blade adapted when the blade is rotating to project cut grass against the said skirts and to drive the grass out through said funnel shaped discharge passage.

3. In a grass mower of the character described, in combination, a horizontal platform having a ground wheel at the center of each side whereby the platform is supported on the ground, the portion of the platform forwardly of said wheels being relatively square and wide and the portion of the platform rearwardly of said wheels tapering inwardly toward the rear of said platform, a front leveling wheel on each side of the platform near its front edge and a rear leveling wheel on each side of the platform near its rear edge, the traction surfaces of all of said leveling wheels being more elevated than the traction surfaces of said ground wheels when the platform is in horizontal position.

4. A grass mower as set forth in claim 3 and in which said platform has a depending skirt along each side and said ground wheels and leveling wheels are mounted on said skirts.

5. A grass mower as set forth in claim 3 in which said platform has a depending skirt along each side and said ground wheels and leveling wheels are mounted on said skirts and the rear ends of said skirts are spaced apart and relatively positioned to form a funnel shaped discharge passage directed laterally at an angle to the direction of the travel of the mower and rearwardly of the adjacent rear leveling wheel of the mower.

JOEL G. DOYLE.

REFERENCES CITED

The following references are of record in the file of this patent:

UNITED STATES PATENTS

| Number | Name | Date |
|---|---|---|
| 1,831,681 | Miller | Nov. 10, 1931 |
| 1,868,347 | Cloud | July 19, 1932 |
| 2,017,524 | Bolens | Oct. 15, 1935 |
| 2,114,096 | Noel | Apr. 12, 1938 |
| 2,185,659 | Chernow | Jan. 2, 1940 |
| 2,198,526 | Cockburn | Apr. 23, 1940 |
| 2,208,972 | Goodall | July 23, 1940 |
| 2,259,672 | Winchell | Oct. 21, 1941 |
| 2,259,676 | Winchell | Oct. 21, 1941 |